United States Patent [19]

Vilotti

[11] 4,330,903
[45] May 25, 1982

[54] FEATHER PLUCKING MACHINE

[76] Inventor: Ronald T. Vilotti, 535 Corbitt Dr., Burlingame, Calif. 94010

[21] Appl. No.: 216,518

[22] Filed: Dec. 15, 1980

[51] Int. Cl.³ ............................................. A22C 21/02
[52] U.S. Cl. ................................................ 17/11.1 R
[58] Field of Search .......................... 17/11.1 R, 18, 47

[56] References Cited

U.S. PATENT DOCUMENTS

| 2,376,120 | 5/1945 | Campbell et al. | 17/11.1 R |
| 2,413,712 | 1/1947 | Jerome | 17/11.1 R |
| 4,288,888 | 9/1981 | Herolzer | 17/11.1 R |

*Primary Examiner*—Willie G. Abercrombie

*Attorney, Agent, or Firm*—Julian Caplan

[57] ABSTRACT

A machine for plucking feathers from game birds, such as ducks, may be made in a home workshop from readily available components. A housing is assembled from pieces of plywood and has a base, sides and a top. A square block is drilled from a shaft which is welded to plates on the ends of the block. Plucking fingers are lengths of hose formed with a series of notches near their ends. The fingers are received in holes in the sides of the block and retained by screws inserted through the block intersecting the fingers. The shaft is journalled in pillow blocks fastened to the base and is turned by a pulley drive from a motor mounted on the rear of the base.

7 Claims, 3 Drawing Figures

FEATHER PLUCKING MACHINE

This invention relates to a new and improved feather plucking machine.

A feature of the invention is the fact that the machine may be readily fabricated in a home workshop using only average skills.

A further feature of the invention is that the components are readily available. The frame of the machine is preferably fabricated from one-half inch plywood. The metal components are the type sold in most hardware stores. It will be understood that the components may be sold as a kit.

Another feature of the invention is the fact that it may be conveniently assembled from the components, using a simple, illustrated instruction manual.

The machine, when completed, is effective in plucking feathers off game birds such as ducks. Hand plucking is largely eliminated. The feathers may, if desired, be collected in the frame, rather than being scattered throughout the room.

A still further feature of the invention is the fact that the machine is safe in operation and injury is avoided.

Other objects and advantages of the present invention will become apparent upon reading the following specification and referring to the accompanying drawings in which similar characters of reference represent corresponding parts in each of the several views.

Figure 1:
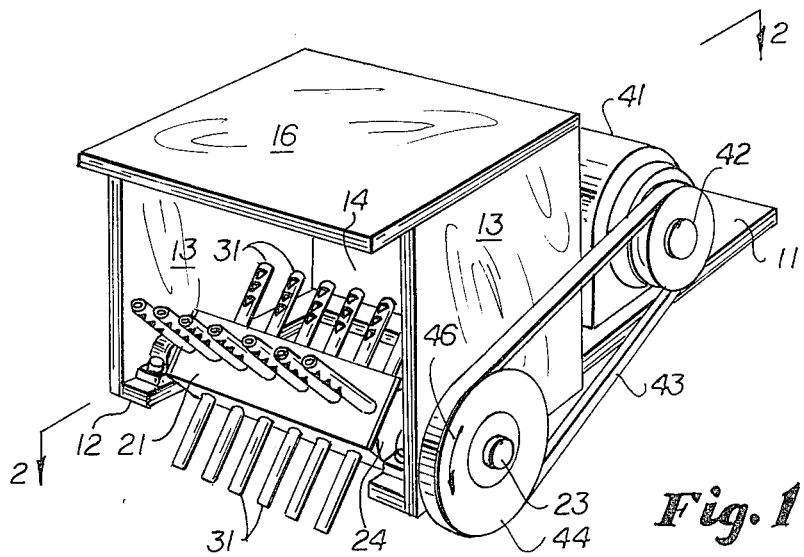
FIG. 1 is a perspective view of a machine constructed in accordance with the present invention.
Figure 3:
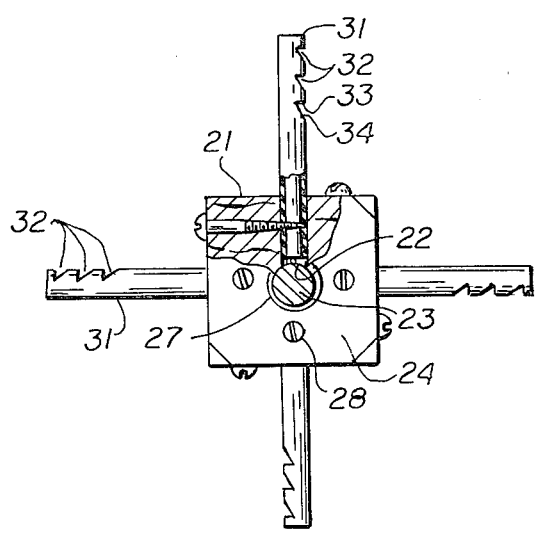
FIG. 3 is an enlarged sectional view taken substantially along the line 3—3 of FIG. 2, with parts broken away to reveal internal construction.
Figure 2:
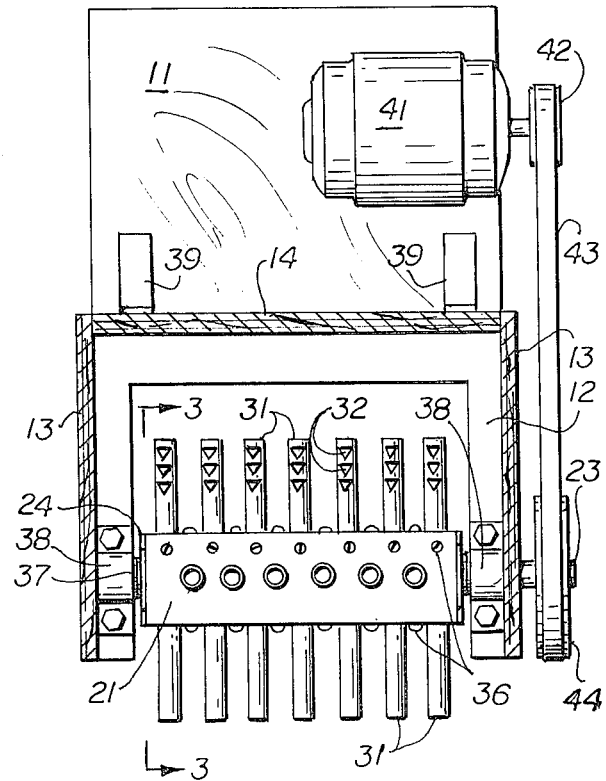
FIG. 2 is a sectional view taken substantially along the line 2—2 of FIG. 1, comprising a plan view of the operating apparatus.

The machine is mounted upon a base 11 which is preferably formed of two superimposed pieces of one-half inch plywood. There are narrow forward extensions 12 on either side of the base 11. After the other components have been assembled, protective sides 13, back 14 and top 16 may be attached to the base by screws (not shown). The two parts of the base 11, as well as the sides 13, back 14 and top 16 may be cut from a standard piece of one-half inch plywood.

A rotor or block 21, preferably of 4×4 wood is drilled with a longitudinally extending hole 22 to receive a shaft 23. To reinforce the structure and hold the shaft in place, plates 24 are used. Plate 24 may be formed from a standard cover for an electrical outlet box. A hole 26 is drilled in the plate to receive the shaft 23 and the shaft is attached thereto by means of welds 27. Screws 28 attach the plate 24 to the end of block 21. Plucking fingers 31 are preferably formed of ⅜" utility rubber air hose cut to approximately 5" lengths. Notches 32 (preferably three in number) are cut adjacent the outer end of each finger 31. Each notch 32 consists of a radial cut 33 and a downward-outwardly slanted cut 34 at about a 45° angle. Holes are drilled in the block 21 to receive the finger 31. Preferably the fingers are staggered—i.e., on one side of the block there may be seven holes for fingers and on the adjacent sides six holes. The fingers 31 are inserted in their holes in such manner that the notches face the operator in the normal direction of rotation of the shaft 23. To secure the fingers in place, screws 36 are threaded into the blocks so as to pierce the walls of the fingers 31.

Pillow blocks 38 are installed adjacent the forward ends of the forward extensions 12 to receive the shaft 23. One end of shaft 23 extends beyond its pillow block 38 and extends through a hole in one of the sides 13.

Motor 41 is mounted on base 11 and has on its shaft a pulley 42 which drives a belt (such as a conventional fan belt) which in turn drives pulley 44 on the end of shaft 23.

The sides back and top are installed and preferably shelf brackets 39 reinforce the support of the back 14 from the base 11.

It will thus be seen that using ordinary carpentry and home shop tools, the wooden parts may be cut from a sheet of plywood and the block 21 drilled for the hole 22 as well as for the holes which receive the fingers 31. The other components are readily fabricated and assembled. To properly locate the block 21 relative to the pillow blocks 38, common washers 37 may be installed on the shaft 23 between the plates 24 and the pillow block 38 to center the block and prevent sideward play.

In use, the motor 41 is installed in such manner that it drives pulley 44 in the direction shown by arrow 46 shown in FIG. 1. The operator places the fowl in such position that it is contacted by the outer ends of the fingers 31, the notches 32 pulling the feathers from the carcass. The wooden framework prevents the feathers from flying around and directs them downward to a bag, or other container, which may be suspended from the base 11 between the extensions 12.

What is claimed is:

1. A feather plucking machine comprising a base, a shaft first means rotatively mounting said shaft on said base, drive means for said shaft, a square block, second means fixing said block for rotation with said shaft, a plurality of fingers, each said finger formed of a piece of tubing with notches cut into said tubing adjacent a first end thereof, holes formed spaced apart longitudinally of each face of said square block, the second ends of said tubing received in said holes, and third means fixing said fingers in said holes.

2. A machine according to claim 1 in which said base has a rear portion and forward extensions on either side of said rear portion, said first means comprising pillow blocks on the outer ends of said extensions, whereby said fingers rotate partly above and partly below the plane of said base.

3. A machine according to claim 1 in which said second means comprises metal plates fixed to each end of said block, said plates being apertured for said shaft and means to secure said plates to said shaft.

4. A machine according to claim 1 in which the numbers of holes in a first face and a third face of said block are one less than the numbers of holes in said second and fourth faces.

5. A machine according to claim 1 which further comprises sides on either side of said base, a back behind said sides and a top above said sides, said sides and said back extending up from said base.

6. A machine according to claim 5 in which a first end of said shaft extends through one said side, said drive means comprising a motor mounted on said base behind said back, pulleys on said motor and said first end of said shaft, and a belt around said pulleys.

7. A machine according to claim 1 in which each said finger has longitudinally spaced notches, each said notch comprising a radial inward first cut and a longitudinally outward, radially inward slanted second cut intersecting said first cut at about a longitudinal medial plane of said finger.

* * * * *